US006232985B1

United States Patent
Chase et al.

(10) Patent No.: US 6,232,985 B1
(45) Date of Patent: *May 15, 2001

(54) INTERACTIVE, DYNAMIC, AUTOMATIC DIMENSION ARRANGEMENT GENERATOR FOR COMPUTER-AIDED DRAFTING PROGRAMS

(75) Inventors: Kurt Philip Chase, Petaluma; Kevin Cummings Jones, San Francisco; Valerie Taylor, San Rafael, all of CA (US)

(73) Assignee: Autodesk, Inc., San Rafael, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,618

(22) Filed: Jun. 15, 1998

(51) Int. Cl.[7] .................................................. G06T 11/20
(52) U.S. Cl. ......................... 345/441; 345/442; 345/443; 345/964
(58) Field of Search ..................................... 345/420, 441, 345/443, 439, 964, 356, 419, 121, 433, 428, 339; 395/161

(56) References Cited

U.S. PATENT DOCUMENTS

| 5,197,120 | * | 3/1993 | Saxton et al. | 345/439 |
| 5,214,757 | * | 5/1993 | Mauney et al. | 395/161 |
| 5,548,707 | * | 8/1996 | LoNegro et al. | 395/161 |
| 5,644,692 | * | 7/1997 | Eick | 395/326 |
| 5,821,941 | * | 10/1998 | Millstein | 345/420 |
| 5,969,708 | * | 10/1999 | Walls | 345/145 |
| 5,999,186 | * | 12/1999 | Jackson | 345/420 |

* cited by examiner

*Primary Examiner*—Matthew Luu
*Assistant Examiner*—Chante' Harrison
(74) *Attorney, Agent, or Firm*—Gates & Cooper LLP (57) ABSTRACT

A method, apparatus, and article of manufacture provides an interactive, dynamic, automatic dimension arrangement generator for a computer-aided drafting (CAD) system. The dimension arrangement generator selects one or more geometric entities displayed on the monitor of the CAD system and extracts one or more relevant dimension points for the selected geometric entities. The dimension arrangement generator selects one or more dimension line positions for the relevant dimension points, and then generates and displays the dimension arrangement for the selected geometric entities on the monitor of the CAD system in accordance with the extracted dimension points and selected dimension line positions.

39 Claims, 12 Drawing Sheets

INTERACTIVE, DYNAMIC, AUTOMATIC DIMENSION ARRANGEMENT GENERATOR FOR COMPUTER-AIDED DRAFTING PROGRAMS

BACKGROUND OF THE INVENTION

1. Field of the Invention

The present invention generally relates to computer-implemented user interfaces, and in particular, to automatically generating continuous, staggered, baseline and ordinate dimension arrangements in a computer-aided drafting (CAD) program using an interactive, dynamic user interface.

2. Description of Related Art

Computer-aided design (CAD) systems have been widely used by designers, drafters, and engineers for a number of years. Most such systems use a graphical user interface (GUI) to display graphical images, such as photorealistic images, 2D or 3D models, schematic diagrams, etc.

Historically, CAD systems have used dimension lines to describe the geometry of objects within an image. Dimension lines are often used to describe the lengths of features or the distances between features. In prior art CAD systems, however, such dimension lines must be manually drawn by the user, which is tedious and time-consuming. Thus, there is a need in the art for improved techniques for generating dimension lines.

SUMMARY OF THE INVENTION

To overcome the limitations in the prior art described above, and to overcome other limitations that will become apparent upon reading and understanding the present specification, the present invention discloses a method, apparatus and article of manufacture that provides an interactive, dynamic, automatic dimension arrangement generator for a computer-aided drafting (CAD) system. The dimension arrangement generator selects one or more geometric entities displayed on the monitor of the CAD system and extracts one or more relevant dimension points for the selected geometric entities. The dimension arrangement generator selects one or more dimension line positions for the relevant dimension points, and then generates and displays the dimension arrangement for the selected geometric entities on the monitor of the CAD system in accordance with the extracted dimension points and selected dimension line positions.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware Environment

Figure 1:
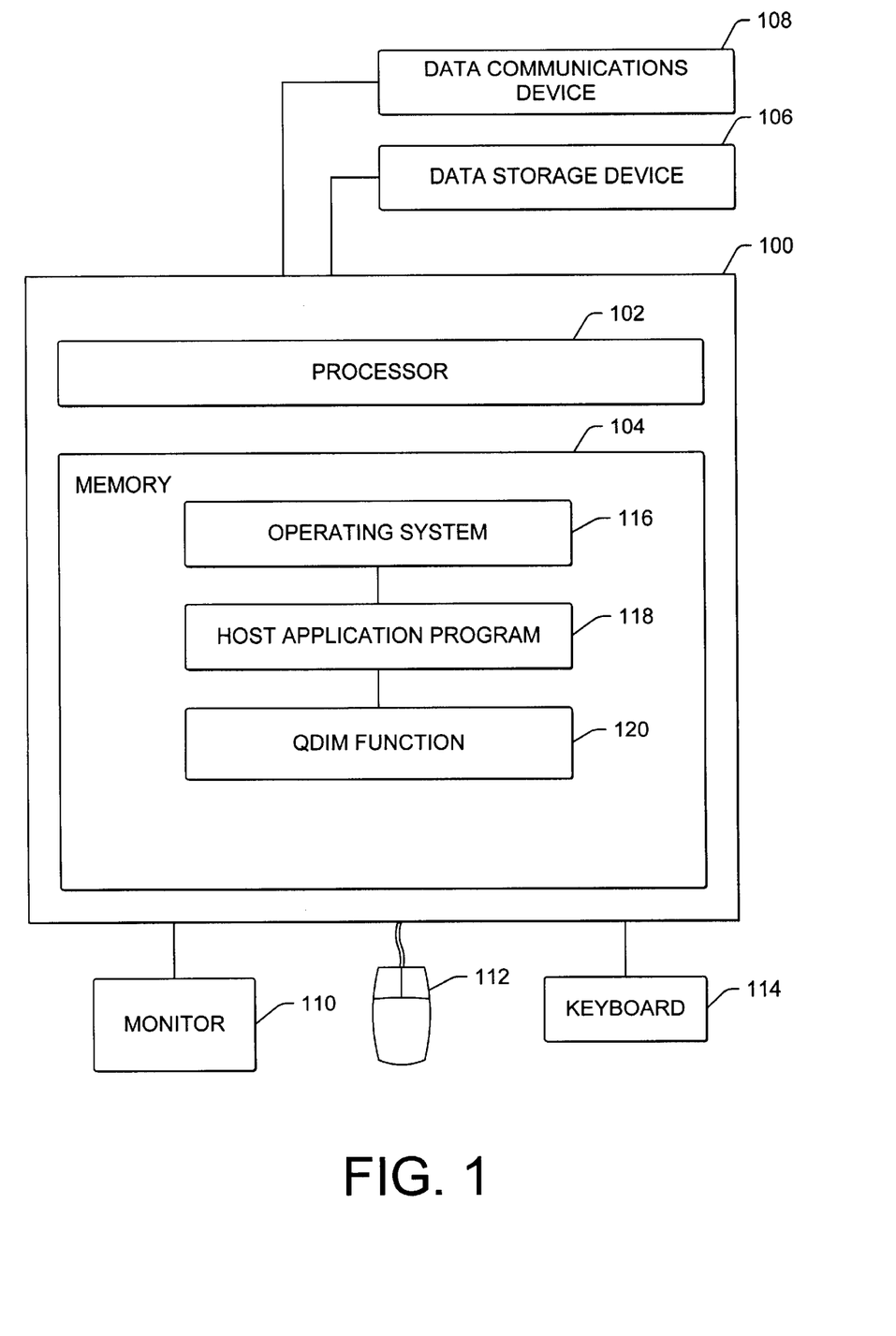
FIG. 1 is an exemplary hardware environment used to implement the preferred embodiment of the invention.

FIG. 1 is an exemplary hardware environment used to implement the preferred embodiment of the invention. The present invention is typically implemented using a personal computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that the personal computer 100 may include other devices such as read only memory (ROM), a video card, bus interface, printers, etc. These components of the personal computer 100 are usually controlled by an operating system 116. Of course, those skilled in the art will recognize that any combination of the above components, or any number of different components, peripherals, and other devices, may be used with the computer 100.

The present invention is usually implemented in a host application program 118 and a QDim function module 120 that are executed by the computer 100. In the preferred embodiment, the host application program 118 comprises the AUTOCAD® program sold by Autodesk, Inc., the assignee of the present invention. Also in the preferred embodiment, the QDim function 120 is an ObjectARX® applet or add-in for use with the AUTOCAD® program 118. Those skilled in the art will recognize that the present invention is applicable to other computer programs and implementation techniques as well.

Generally, the computer programs 118, 120 that implement the preferred embodiment of the invention are embodied in or readable from a computer-readable medium, device, or carrier, e.g., one or more of the fixed and/or removable data storage data devices 106 and/or remote computers or devices connected to the computer 100 via the data communications devices 108. Under control of operating system 116, the computer programs 118, 120 may be loaded from the data storage devices 106 or data communications devices 108 into the memory 104 of computer 100. The computer programs 118, 120 comprise instructions which, when read and executed by computer 100, cause the computer 100 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Operation of the QDim Function

FIGS. 2A–2H are "snapshots" of the graphical user interface (GUI) 200 elements displayed on the monitor 110 by the host application program 118 when accepting commands to invoke the QDim function 120 and when performing the QDim function 120, in one example of the operation of the present invention. In this example, the QDim function 120 operates with the AUTOCAD® program 118.

Figure 2A:
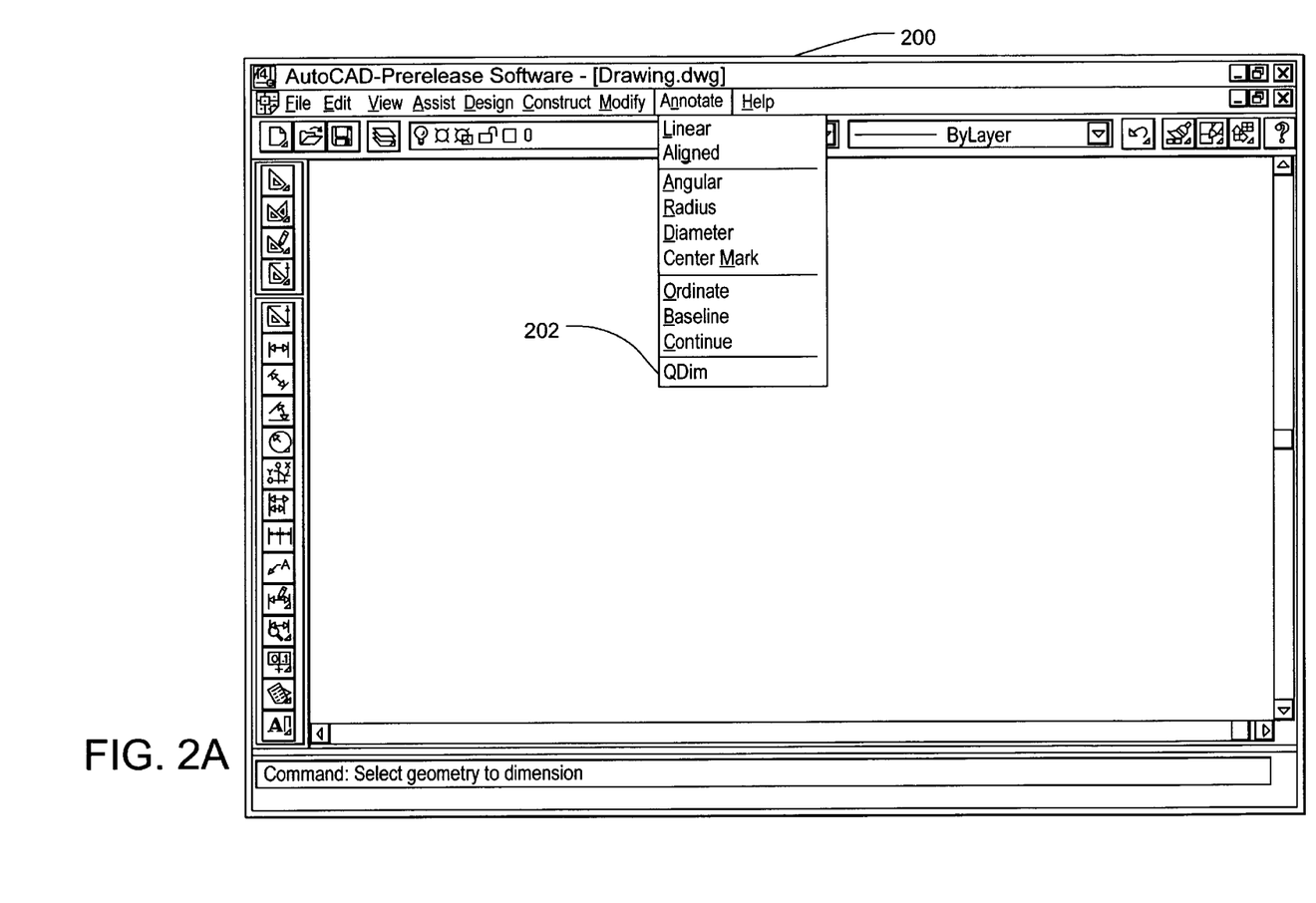
FIGS. 2A–2H are "snapshots" of graphical user interface elements displayed on the monitor by the present invention in a preferred embodiment.

The QDim function 120 is generally invoked from a menu item 202, as shown in FIG. 2A, although command lines or toolbars or mouse gestures or other customary ways of invoking commands may be used as well. In the example of FIG. 2A, the user selects the "QDim" menu item 202 from an "Annotate" menu displayed by the host application program 118.

Upon invocation of the QDim function 120, the following prompt is displayed on the command line, as illustrated at the bottom of FIG. 2A:

"Select geometry to dimension"

The geometric entities 204 supported in the present invention include: points, lines, arcs, circles and polylines.

Figure 2B:
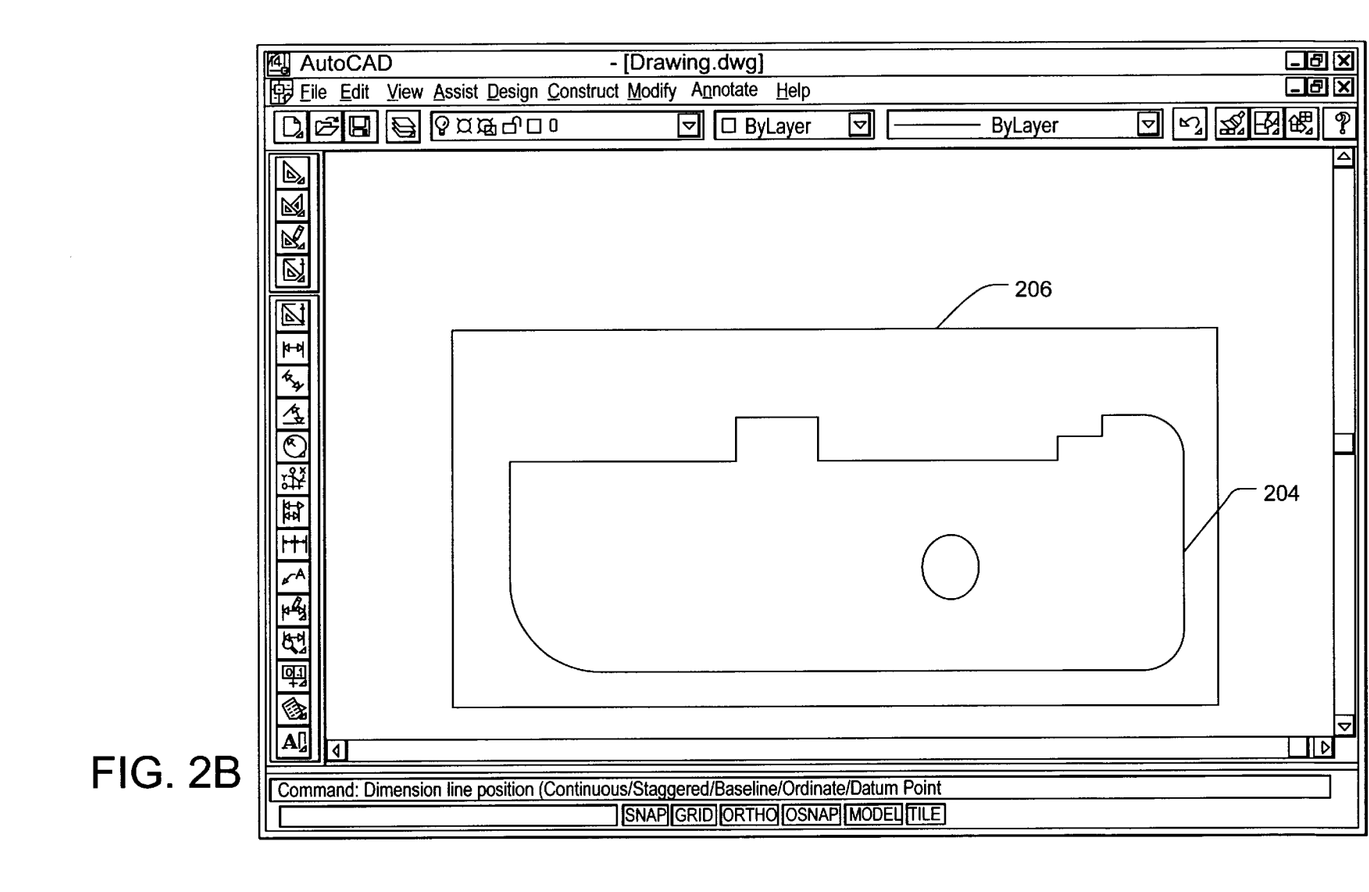

The user selects one or more geometric entities 204 displayed on the monitor 110, as shown in FIG. 2B, using any number of different selection techniques, e.g., via a mouse or keyboard. In the example of FIG. 2B, the geometric entity 204 is selected by enveloping it with a selection box 206, which is a technique well known in the art.

Thereafter, the QDim function 120 extracts the relevant dimension points for the selected geometric entities 204. The relevant dimension points for different geometric entities are summarized in the following table:

TABLE I

| Point Entity | The position of the point |
| Line Entity | Both of the line's end points |
| Arc Entity | The center of the arc |
| Circle Entity | The center of the circle |
| Polyline Entity | All vertices of the polyline |

After selection of the desired geometric entities, the following prompt is displayed on the command line, as illustrated at the bottom of FIG. 2B:

"Dimension line position (Continuous/Staggered/Baseline/Ordinate/Datum Point)"

The user indicates the desired dimension line position using any number of different indication techniques, e.g., via a mouse or keyboard. Moreover, the user may indicate a change to the dimension arrangement generated or a change to the datum point used for ordinate arrangements and baseline arrangements.

The following table summarizes the functions associated with each of the keywords found in the prompt displayed on the command line at the bottom of FIG. 2B:

TABLE II

| Continuous | To generate a continuous dimension arrangement |
| Staggered | To generate a staggered dimension arrangement |
| Baseline | To generate a baseline dimension arrangement |
| Ordinate | To generate an ordinate dimension arrangement |
| Datum Point | To select a new datum point for baseline and ordinate dimension arrangement generation. |

The default dimension arrangement is continuous and the default datum point is the smallest relevant dimension point extracted from the selected geometry.

After the desired dimension line position is selected, the dimension arrangement is generated and displayed on the monitor. The QDim function 120 ensures that the dimension text is displayed correctly on the monitor 120, and thus carefully formats successive dimensions in such a manner that readability for the entire arrangement is preserved.

Figure 2C:
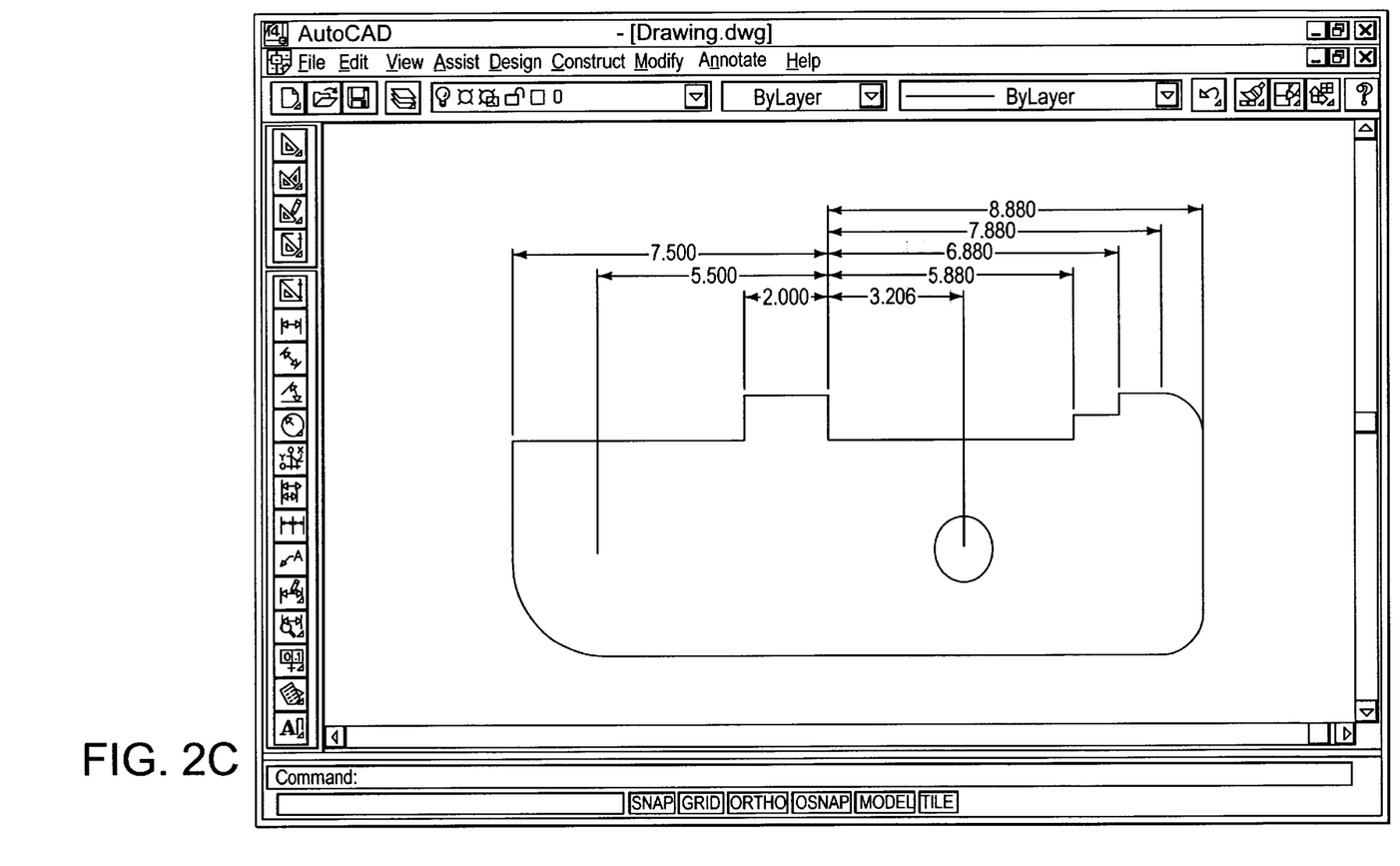
Figure 2D:
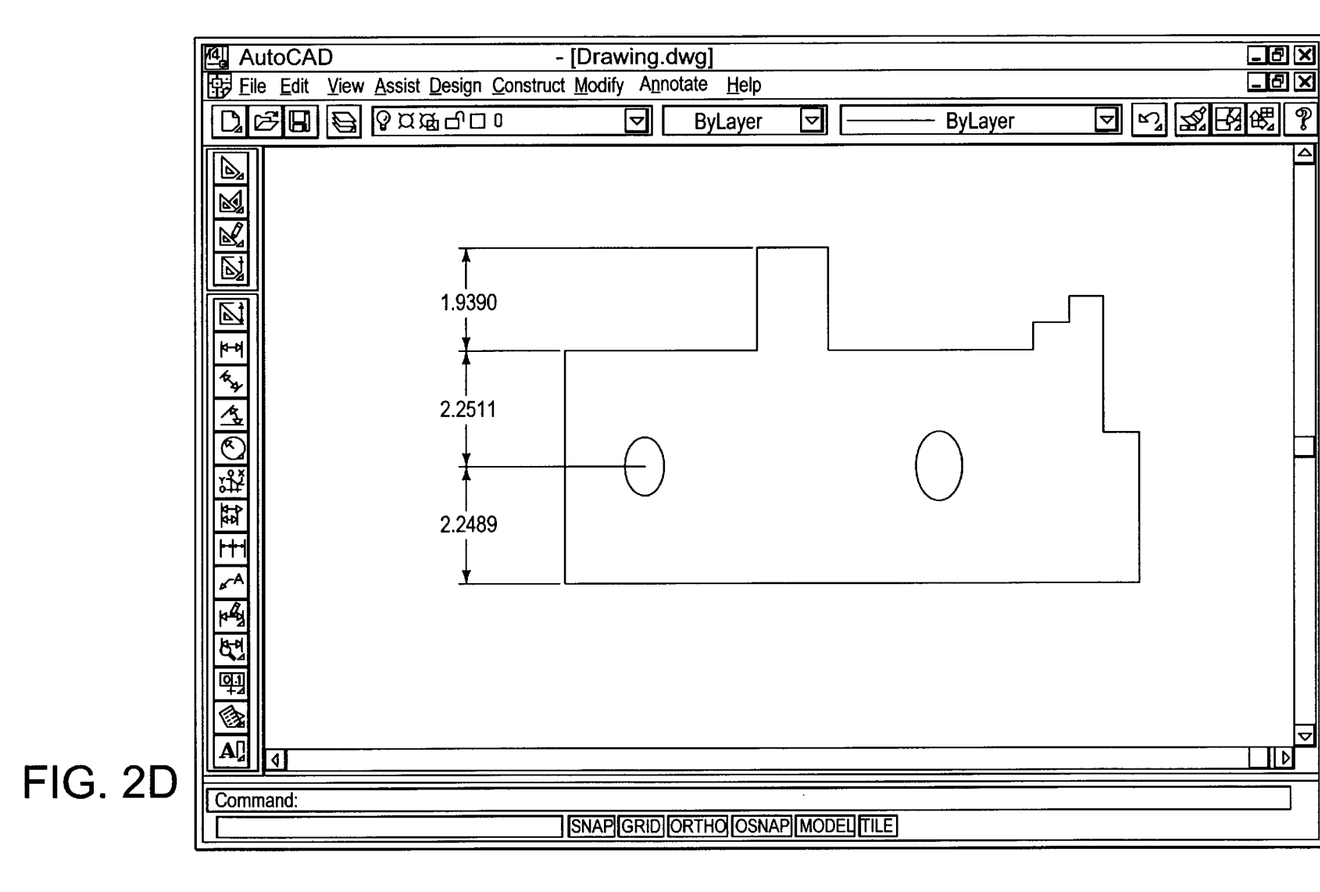
Figure 2E:
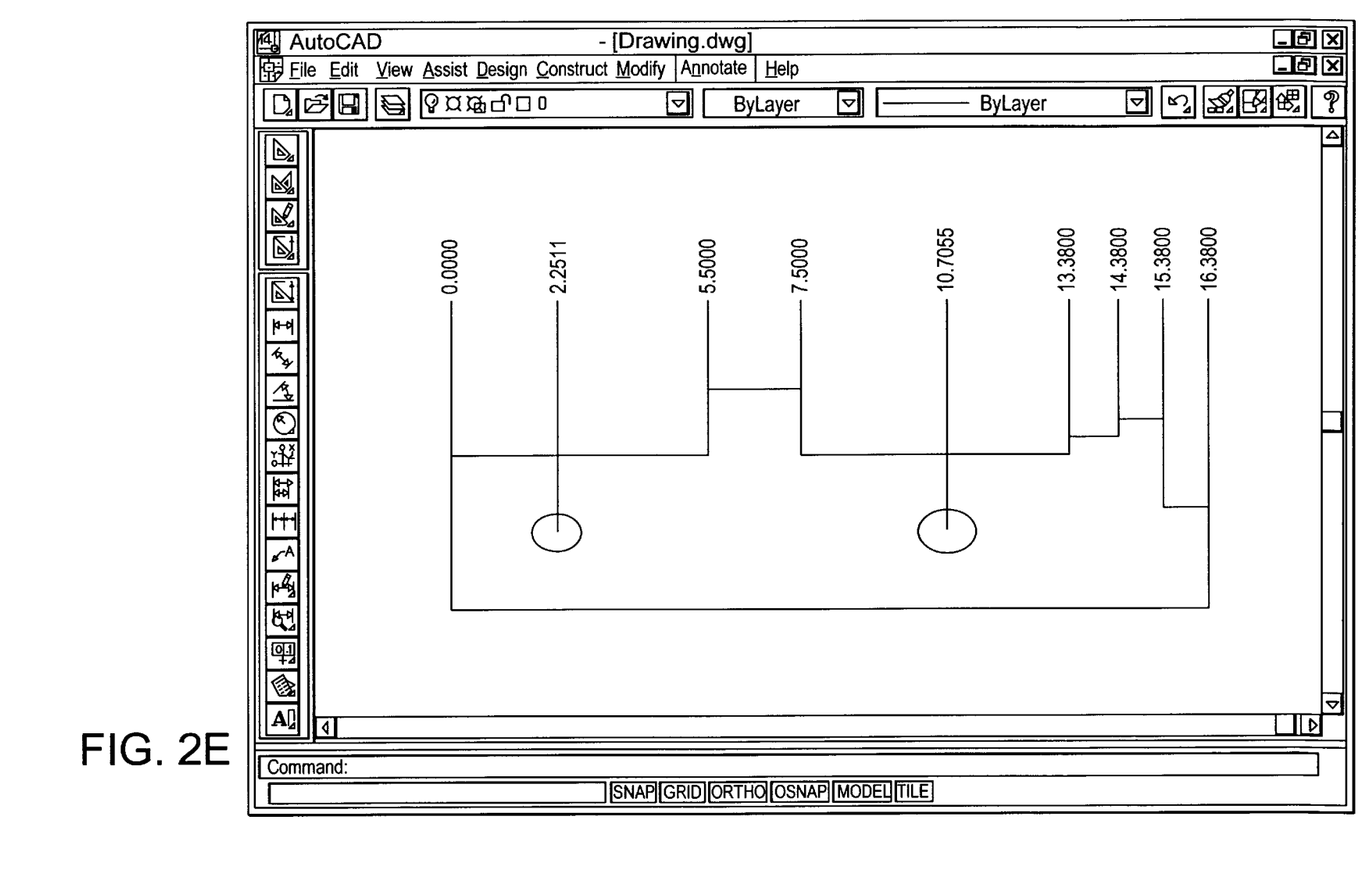
Figure 2F:
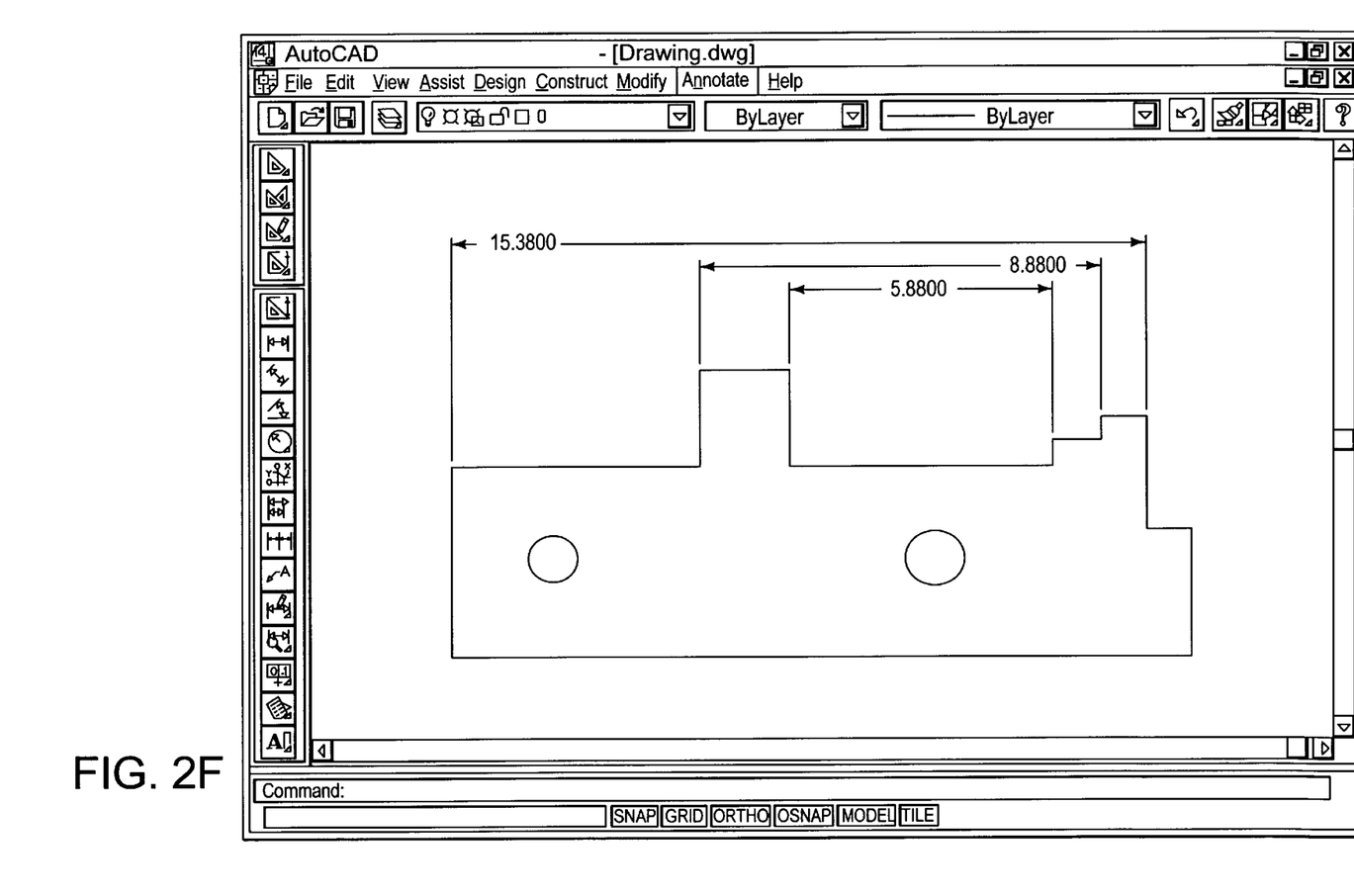

FIGS. 2C–2F illustrate examples of the desired effects of the QDim function 120 displayed on the monitor 110, wherein FIG. 2C illustrates a baseline dimension arrangement; FIG. 2D illustrates a continuous dimension arrangement, FIG. 2E illustrates an ordinate dimension arrangement, and FIG. 2F illustrates a staggered dimension arrangement.

When indicating a dimension line position, the user is given a visual cue or drag image, which displays a representation of the desired dimension arrangement. The user can create dimension arrangements along a horizontal or vertical axis, depending upon the position of the cursor as displayed on the monitor 110. Moreover, when the cursor is moved, the relevant dimension points are dynamically sorted and the drag image is updated appropriately.

Figure 2G:
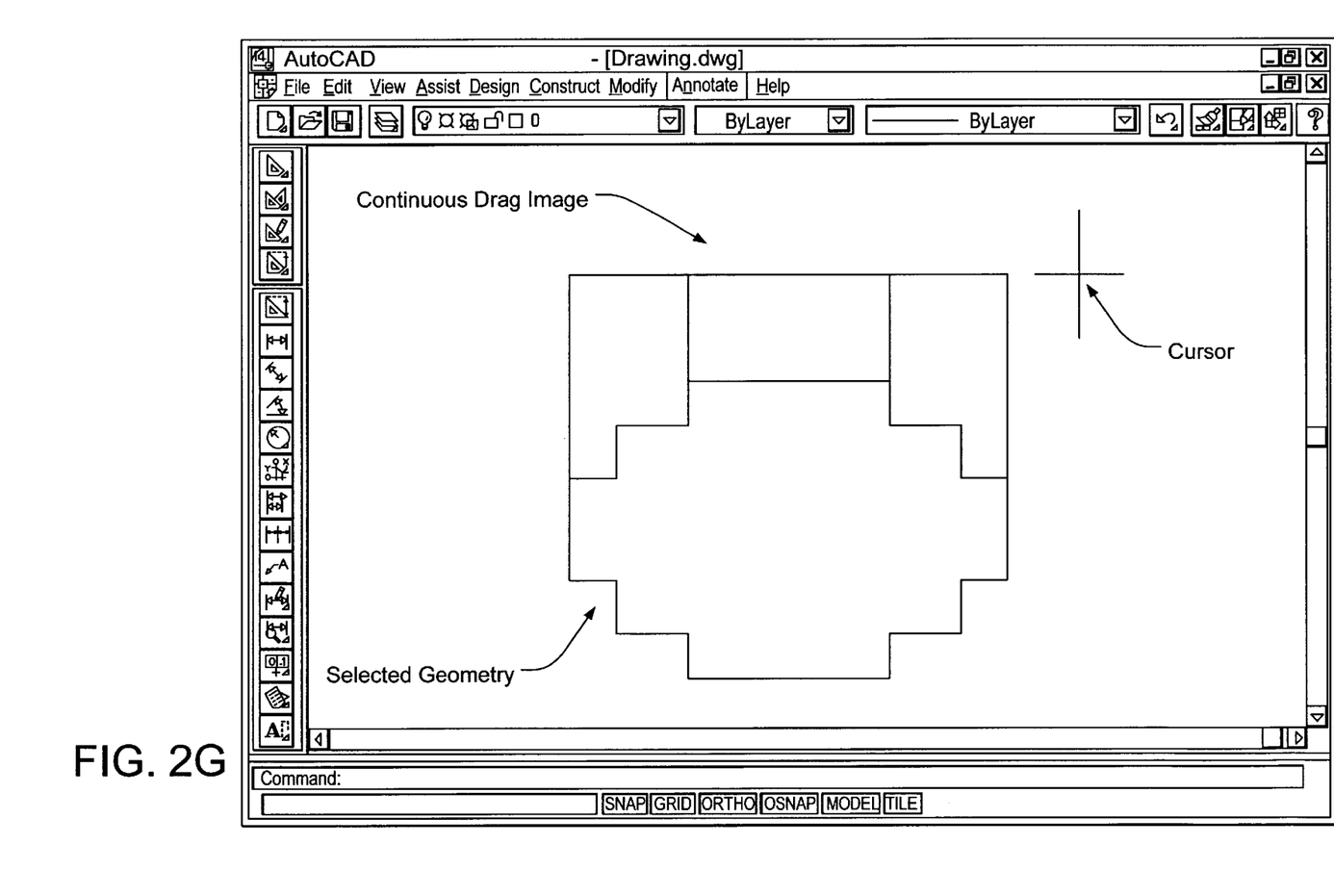
Figure 2H:
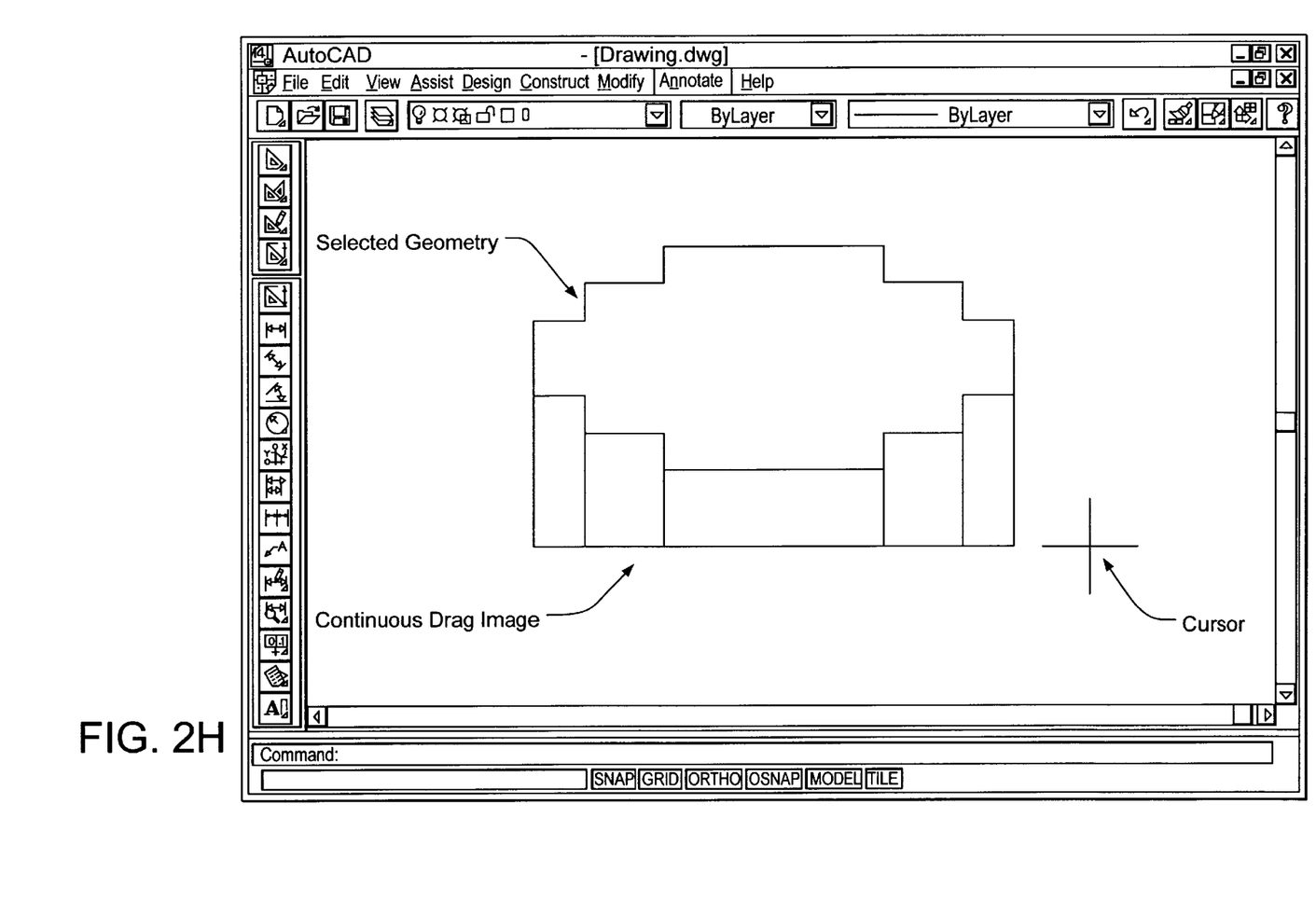

FIGS. 2G–2H illustrate how the QDim function 120 dynamically sorts the relevant dimension points in relation to the current cursor position, wherein FIG. 2G illustrates how dimension points are sorted in relation to the cursor position when the cursor is positioned in an upper horizontal position, and FIG. 2H illustrates how dimension points are sorted in relation to the cursor position when the cursor is positioned in a lower horizontal position. FIGS. 2G and 2H also illustrate how the user receives a visual cue or drag image, which shows them exactly how the dimension arrangement will appear.

Note that these figures illustrate dynamic dimension point sorting along a horizontal axis, although sorting and dimension arrangement creation can also occur along the vertical axis, if the user moves the cursor in the appropriate direction. Also, these figures illustrate a continuous dimension drag image, although drag images are also displayed for all other dimension arrangement types, baseline, ordinate and staggered.

The QDim function 120 also includes an Edit option that allows users to interactively add or remove dimension points from the current set. In addition, the QDim function 120 has the ability to process dimensions as objects selected for dimensioning to enable regeneration of an arrangement when its readability has been comprised.

Logic of the QDim Function

Figure 3:
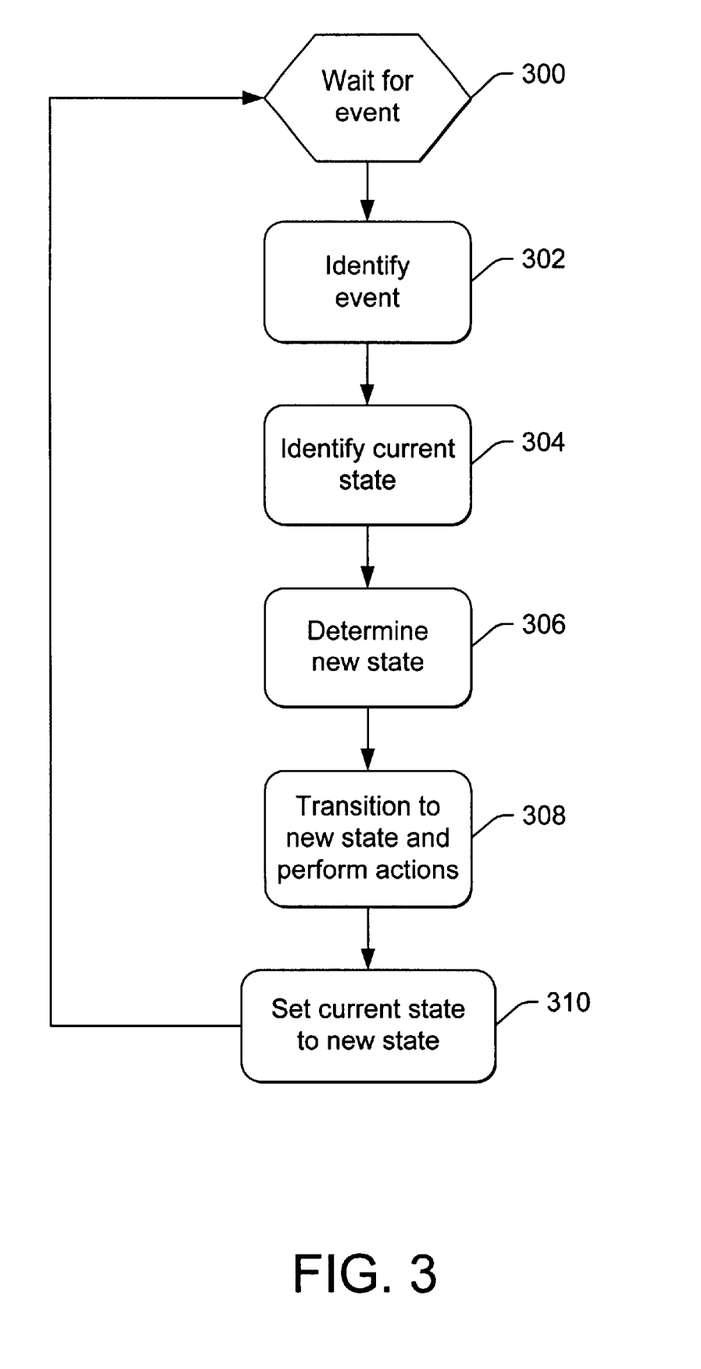
FIG. 3 is a flowchart that illustrates the general logic of a message or event-driven computer system performing the steps of the present invention.
Figure 4:
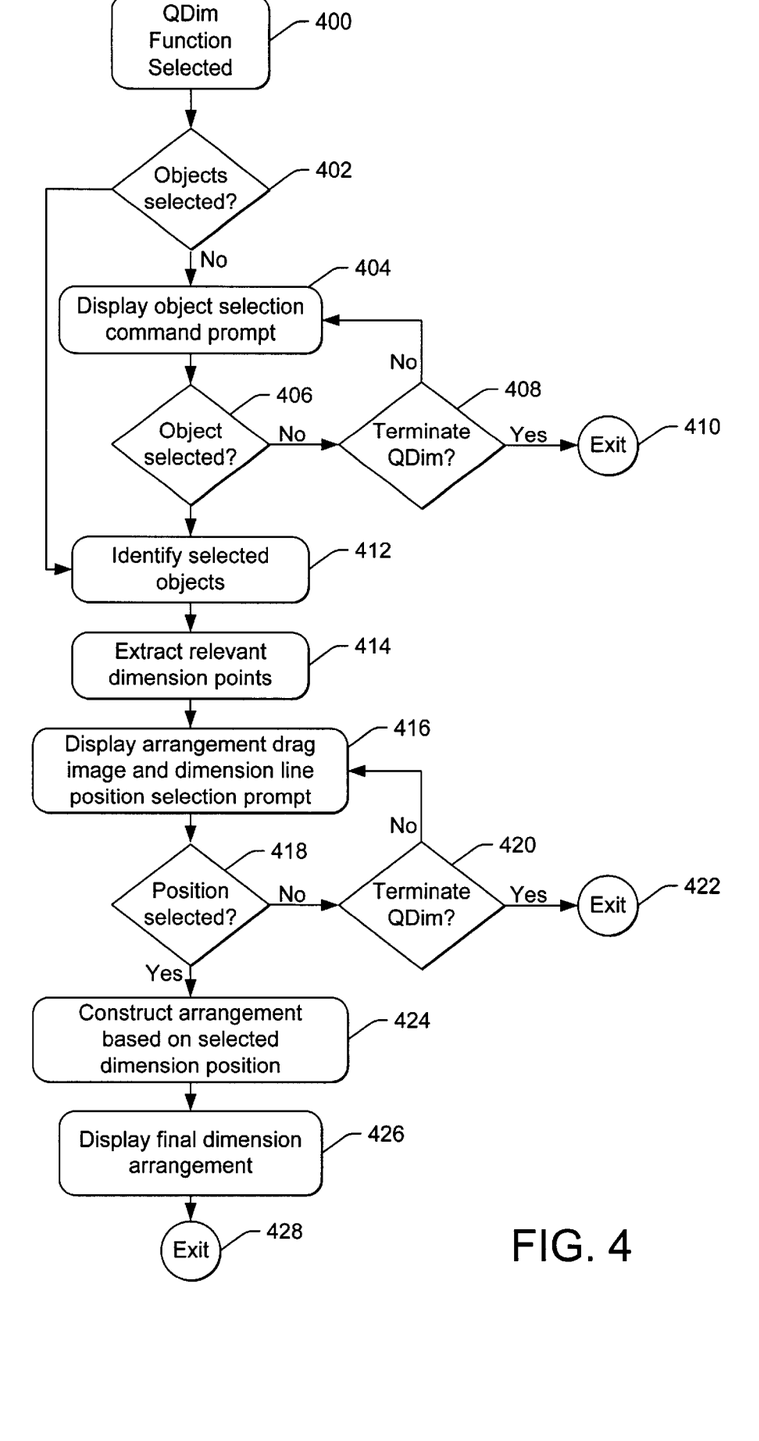
FIG. 4 is a flowchart that illustrates the general logic that is performed for the QDim function according to the present invention.
Figure 5:
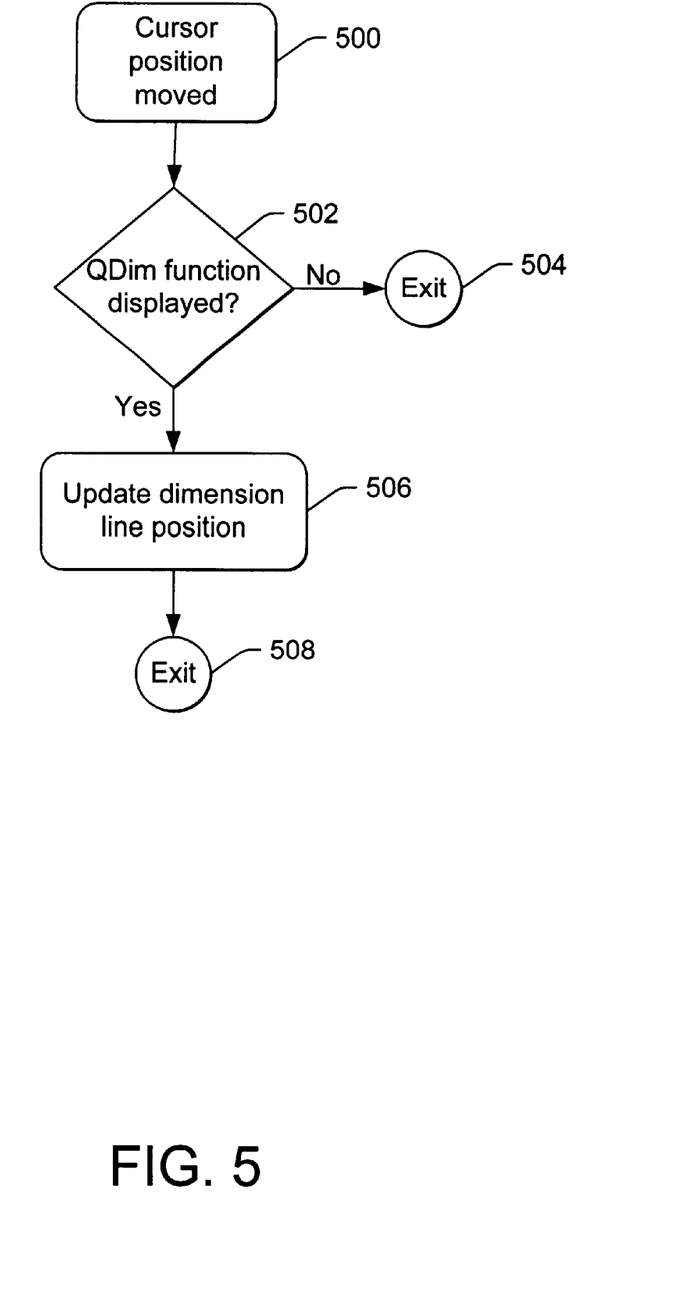
FIG. 5 is a flowchart that illustrates the general logic that is performed to when the cursor position is moved according to the present invention.

Flowcharts which illustrate the logic of the QDim function 120 are shown in FIGS. 3, 4, and 5. Those skilled in the art will recognize that this logic is provided for illustrative purposes only and that different logic may be used to accomplish the same results.

In the preferred embodiment, the various operations described below are specifically related to the AUTOCAD® host application program 118. Of course, those skilled in the art will recognize that the use of the QDim function 120 with different host application programs 118 may result in the different operations (or potentially the same operations).

FIG. 3 is a flowchart that illustrates the general logic of a message or event-driven computer 100 performing the steps of the present invention. In such a computer 100, operations are performed when transitions are made, based upon the receipt of messages or events, from present or current states to new states.

Generally, the flowchart begins by waiting at block 300 for an event (e.g., a mouse button click). It should be appreciated that during this time, other operating system 116 tasks, e.g., file, memory, and video tasks, etc., may also be carried out. When an event occurs, control passes to block 302 to identify the event. Based upon the event, as well as the current state of the system determined in block 304, a new state is determined in block 306. In block 308, the logic transitions to the new state and performs any actions required for the transition. In block 310, the current state is set to the previously determined new state, and control returns to block 300 to wait for more input events.

The specific operations that are performed by block 308 when transitioning between states will vary depending upon the current state and the event. The various operations required to implement and maintain the QDim function 120 of the present invention represent particular events handled by the logic. However, it should be appreciated that these operations represent merely a subset of all of the events handled by the computer 100.

FIG. 4 is a flowchart that illustrates the general logic that is performed when the QDim function 120 is invoked. The logic begins at block 400 when the QDim function 120 is selected.

Block 402 is a decision block that represents the computer 100 determining whether any objects were selected by the user. If not, control transfers to Block 404; otherwise, control transfers to Block 412.

Block 404 represents the computer 100 displaying the object selection command prompt on the monitor 102.

Block 406 is a decision block that represents the computer 100 determining whether an object was selected by the user. If not, control transfers to Block 408; otherwise, control transfers to Block 412.

Block 408 is a decision block that represents the computer 100 determining whether to terminate the QDim function 120. If not, control transfers to Block 404; otherwise, control transfers to Block 410.

Block 412 represents the computer 100 identifying the selected objects. Block 414 represents the computer 100 extracting relevant dimension points of the selected object. Block 416 represents the computer 100 displaying the dimension arrangement drag image and the dimension line position selection prompt on the monitor 102.

Block 418 is a decision block that represents the computer 100 determining whether a position was selected by the user. If not, control transfers to Block 420; otherwise, control transfers to Block 422.

Block 420 is a decision block that represents the computer 100 determining whether to terminate the QDim function 120. If not, control transfers to Block 416; otherwise, control transfers to Block 422.

Block 424 represents the computer 100 constructing the dimension arrangement based on the selected dimension line position. Block 426 represents the computer 100 displaying the final dimension arrangement in the selected position relative to the selected object.

Block 428 represents the termination of the logic.

FIG. 5 is a flowchart that illustrates the general logic that is performed when the cursor position is moved while the results of the QDim function 120 are being displayed. The logic begins at block 500 when the cursor positioned is moved.

Block 502 is a decision block that represents the computer 100 determining whether the results of the QDim function 120 are displayed on the monitor 102. If not, control transfers to Block 504; otherwise, control transfers to Block 506.

Block 506 represents the computer 100 updating the displayed dimension lines based on the position of the cursor.

Block 508 represents the termination of the logic.

CONCLUSION

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any software program, application or operating system having a graphical user interface could benefit from the present invention.

In summary, the present invention discloses a method, apparatus, and article of manufacture that provides an interactive, dynamic, automatic dimension arrangement generator for a computer-aided drafting (CAD) system. The dimension arrangement generator selects one or more geometric entities displayed on the monitor of the CAD system and extracts one or more relevant dimension points for the selected geometric entities. The dimension arrangement generator selects one or more dimension line positions for the relevant dimension points, and then generates and displays the dimension arrangement for the selected geometric entities on the monitor of the CAD system in accordance with the extracted dimension points and selected dimension line positions.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for dynamically generating a dimension arrangement for an image generated by a computer, comprising:

(a) selecting one or more geometric entities displayed on a monitor attached to the computer;

(b) automatically extracting one or more relevant dimension points for the selected geometric entities;

(c) selecting one or more dimension line positions for the relevant dimension points; and (d) automatically generating and displaying an initial dimension arrangement for the selected geometric entities on the monitor in accordance with the extracted dimension points and selected dimension line positions.

2. The method of claim 1 above, wherein the geometric entities are selected from a group comprising a point, a line, an arc, a circle and a polyline.

3. The method of claim 2 above, wherein the extracted dimension points comprise the point's position.

4. The method of claim 2 above, wherein the extracted dimension points comprise the line's end points.

5. The method of claim 2 above, wherein the extracted dimension points comprise a center of the arc.

6. The method of claim 2 above, wherein the extracted dimension points comprise a center of the circle.

7. The method of claim 2 above, wherein the extracted dimension points comprise vertices of the polyline.

8. The method of claim 1 above, wherein the dimension line positions are selected from a group comprising continuous, staggered, baseline, ordinate, and datum point line positions.

9. The method of claim 1 above, further comprising providing a visual clue to the user while in the process of indicating the dimension line position.

10. The method of claim 9 above, wherein the visual clue comprises a representation of a desired dimension arrangement.

11. The method of claim 9 above, wherein the visual clue comprises a drag image of a desired dimension arrangement.

12. The method of claim 1, above, further comprising displaying the dimension arrangement along a horizontal or vertical axis depending upon a position of a cursor as displayed on the monitor.

13. The method of claim 12 above, further comprising dynamically sorting the relevant dimension points and updating the dimension arrangement appropriately when the cursor is moved.

14. An apparatus for dynamically generating a dimension arrangement for a computer-generated image, comprising:
 (a) a computer having a monitor attached thereto;
 (b) means, performed by the computer, for selecting one or more geometric entities displayed on the monitor,
 (c) means, performed by the computer, for automatically extracting one or more relevant dimension points for the selected geometric entities;
 (d) means, performed by the computer, for selecting one or more dimension line positions for the relevant dimension points; and
 (e) means, performed by the computers for automatically generating and displaying an initial dimension arrangement for the selected geometric entities on the monitor in accordance with the extracted dimension points and selected dimension line positions.

15. An article of manufacture comprising a computer program carrier readable by a computer and embodying one or more instructions executable by the computer to perform method steps for dynamically generating a dimension arrangement for an image generated by a computer, the method comprising:
 (a) selecting one or more geometric entities displayed on a monitor attached to the computer;
 (b) automatically extracting one or more relevant dimension points for the selected geometric entities;
 (c) selecting one or more dimension line positions for the relevant dimension points; and
 (d) automatically generating and displaying an initial dimension arrangement for the selected geometric entities on the monitor in accordance with the extracted dimension points and selected dimension line positions.

16. The apparatus of claim 14 above, wherein the geometric entities are selected from a group comprising a point, a line, an arc, a circle and a polyline.

17. The apparatus of claim 16 above, wherein the extracted dimension points comprise the point's position.

18. The apparatus of claim 16 above, wherein the extracted dimension points comprise the line's end points.

19. The apparatus of claim 16 above, wherein the extracted dimension points comprise a center of the arc.

20. The apparatus of claim 16 above, wherein the extracted dimension points comprise a center of the circle.

21. The apparatus of claim 16 above, wherein the extracted dimension points comprise vertices of the polyline.

22. The apparatus of claim 14 above, wherein the dimension line positions are selected from a group comprising continuous, staggered, baseline, ordinate, and datum point line positions.

23. The apparatus of claim 14 above, further comprising means for providing a visual clue to the user while in the process of indicating the dimension line position.

24. The apparatus of claim 23 above, wherein the visual clue comprises a representation of a desired dimension arrangement.

25. The apparatus of claim 23 above, wherein the visual clue comprises a drag image of a desired dimension arrangement.

26. The apparatus of claim 14 above, further comprising means for displaying the dimension arrangement along a horizontal or vertical axis depending upon a position of a cursor as displayed on the monitor.

27. The apparatus of claim 26 above, further comprising means for dynamically sorting the relevant dimension points and updating the dimension arrangement appropriately when the cursor is moved.

28. The article of manufacture of claim 15 above, wherein the geometric entities are selected from a group comprising a point, a line, an arc, a circle and a polyline.

29. The article of manufacture of claim 28 above, wherein the extracted dimension points comprise the point's position.

30. The article of manufacture of claim 28 above, wherein the extracted dimension points comprise the line's end points.

31. The article of manufacture of claim 28 above, wherein the extracted dimension points comprise a center of the arc.

32. The article of manufacture of claim 28 above, wherein the extracted dimension points comprise a center of the circle.

33. The article of manufacture of claim 28 above, wherein the extracted dimension points comprise vertices of the polyline.

34. The article of manufacture of claim 15 above, wherein the dimension line positions are selected from a group comprising continuous, staggered, baseline, ordinate, and datum point line positions.

35. The article of manufacture of claim 15 above, further comprising providing a visual clue to the user while in the process of indicating the dimension line position.

36. The article of manufacture of claim 35 above, wherein the visual clue comprises a representation of a desired dimension arrangement.

37. The article of manufacture of claim 35 above, wherein the visual clue comprises a drag image of a desired dimension arrangement.

38. The article of manufacture of claim 15 above, further comprising displaying the dimension arrangement along a horizontal or vertical axis depending upon a position of a cursor as displayed on the monitor.

39. The article of manufacture of claim 38 above, further comprising dynamically sorting the relevant dimension points and updating the dimension arrangement appropriately when the cursor is moved.

\* \* \* \* \*